Jan. 17, 1939.   C. H. NORDELL   2,144,385
SEWAGE TREATMENT APPARATUS
Filed March 18, 1935   3 Sheets—Sheet 1
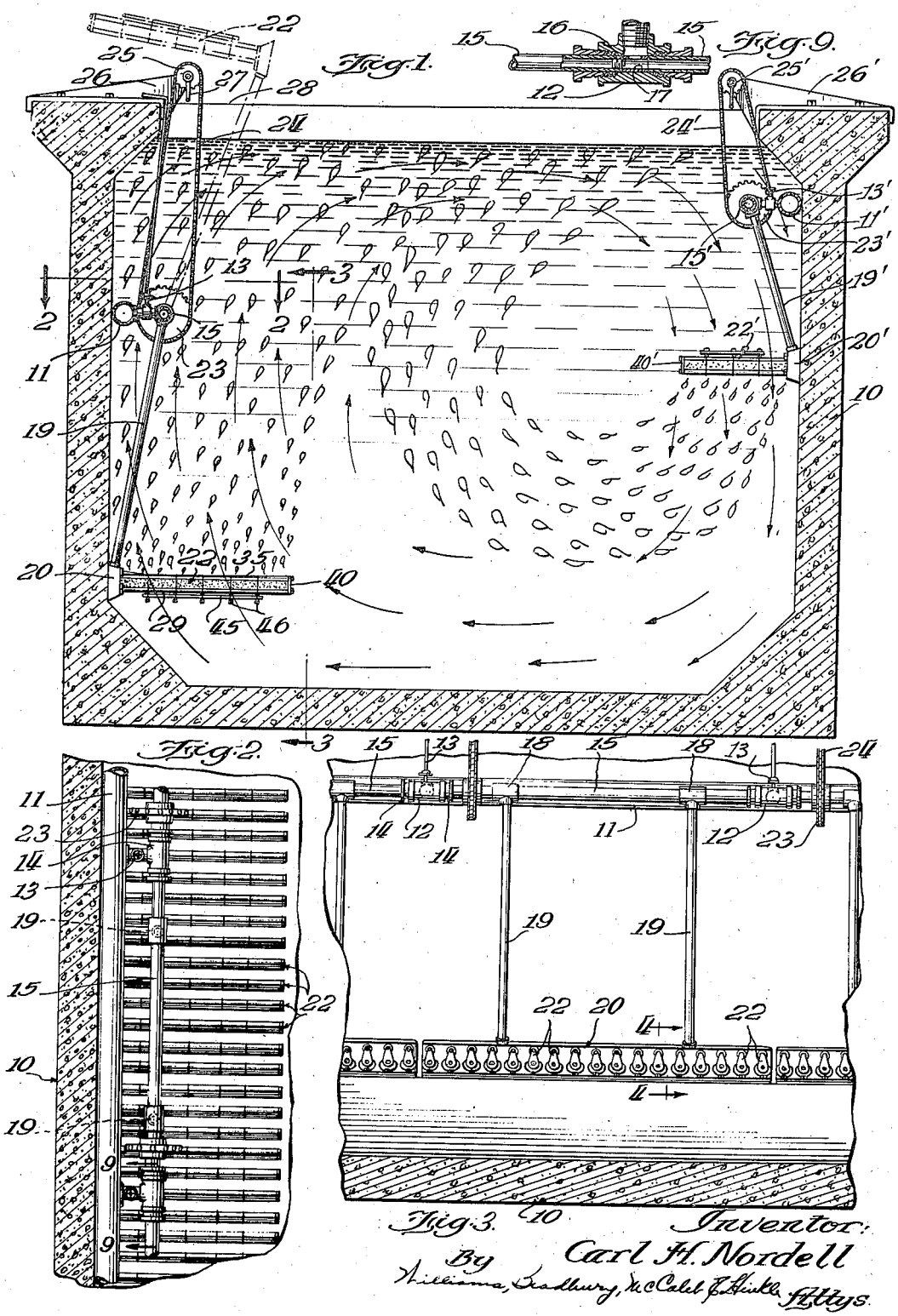
Inventor:
Carl H. Nordell
By Williams, Bradbury, McCaleb & Hinkle Attys.

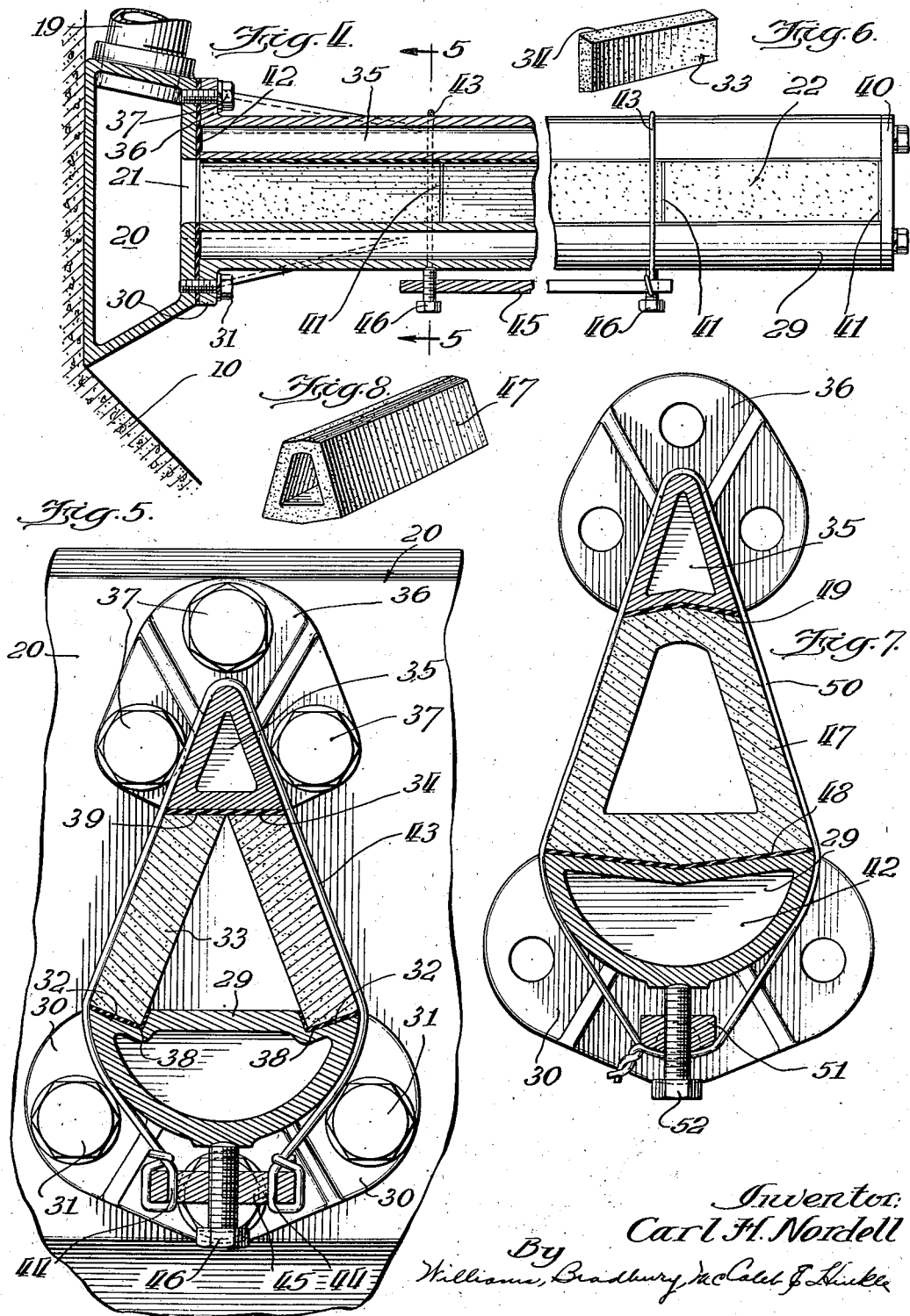

Patented Jan. 17, 1939

2,144,385

UNITED STATES PATENT OFFICE 2,144,385

SEWAGE TREATMENT APPARATUS

Carl H. Nordell, Chicago, Ill., assignor to Advance Engineering Company, Chicago, Ill., a corporation of Illinois Application March 18, 1935, Serial No. 11,554

15 Claims. (Cl. 210—8)

This invention relates to sewage treatment apparatus and particularly to diffusers for supplying air in sewage treatment processes.

In sewage treatment, it is well known to subject sewage and activated sludge to aeration in aeration tanks and for this purpose it is well known to employ long tanks or a series of tanks through which the mixed liquid flows. Such tanks are provided with diffusers for the purpose of supplying large quantities of air thereto in finely divided condition. The purification operation is accompanied by the consumption of oxygen and one of the main effects of the introduction of air is to supply and replenish this oxygen. Another effect of the introduction of the air is to cause a rotation of the mixed liquids in the tank, which rotation effectively prevents settling out of solid and heavy materials.

Heretofore it has been usual to provide such tanks at or near the bottom with plates of porous or foraminous material through which the necessary air is supplied. A diffuser system possesses many serious objections. In the first place, to replace a diffuser plate it is necessary to stop the process and empty the tank, and it must be borne in mind that these tanks may be very, very large. A further objection is that the liquid in the tanks goes into a whirling or rotating motion which passes near the edges of the diffusers. The tendency is for the whirling mass to localize the path of the air delivered by the diffuser plates into a relatively narrow band of the liquid. This localization is very objectionable from the point of view of efficient dissolution of oxygen in the liquid. Another serious objection of the diffuser systems heretofore known is that there is a substantial tendency for solid materials to deposit upon them, thus reducing their air passing efficiency. This occurrence is believed to be due to the reduced specific gravity of the liquid above the diffuser plates, owing to the presence of a very large amount of air therein. It is believed that solid or nearly solid materials which are just able to remain suspended in flowing water or sewage, drop out of the lighter column of air and liquid which exists above the diffuser plates.

The principal objects of the present invention are to provide an improved diffuser system which will be free from these advantages, which will be economical and simple to construct, and which can readily be serviced without emptying the aeration tank and, in fact, without interrupting the purification operation, except at the point where repairs or adjustment are necessary.

Other objects, capabilities and advantages of the invention will appear from the following description of preferred embodiments thereof, taken in conjunction with the accompanying drawings, in which—

Figure 1 is a cross section of an aeration tank equipped with aerators embodying my invention;

Fig. 2 is a fragmentary plan view, taken on the line 2—2 of Fig. 1;

Fig. 3 is a fragmentary sectional elevational view, taken on the line 3—3 of Fig. 1;

Fig. 4 is a sectional view through a diffuser element, taken on the line 4—4 of Fig. 3, and on a somewhat larger scale;

Fig. 5 is a fragmentary sectional view on a still larger scale, taken on the line 5—5 of Fig. 4;

Fig. 6 is a perspective view of a diffuser plate included in the embodiment of the invention illustrated in Figs. 4 and 5;

Fig. 7 is a sectional view similar to Fig. 5, showing a modified form of diffusing element;

Fig. 8 is a perspective view of such a diffuser element;

Figures 10, 11:
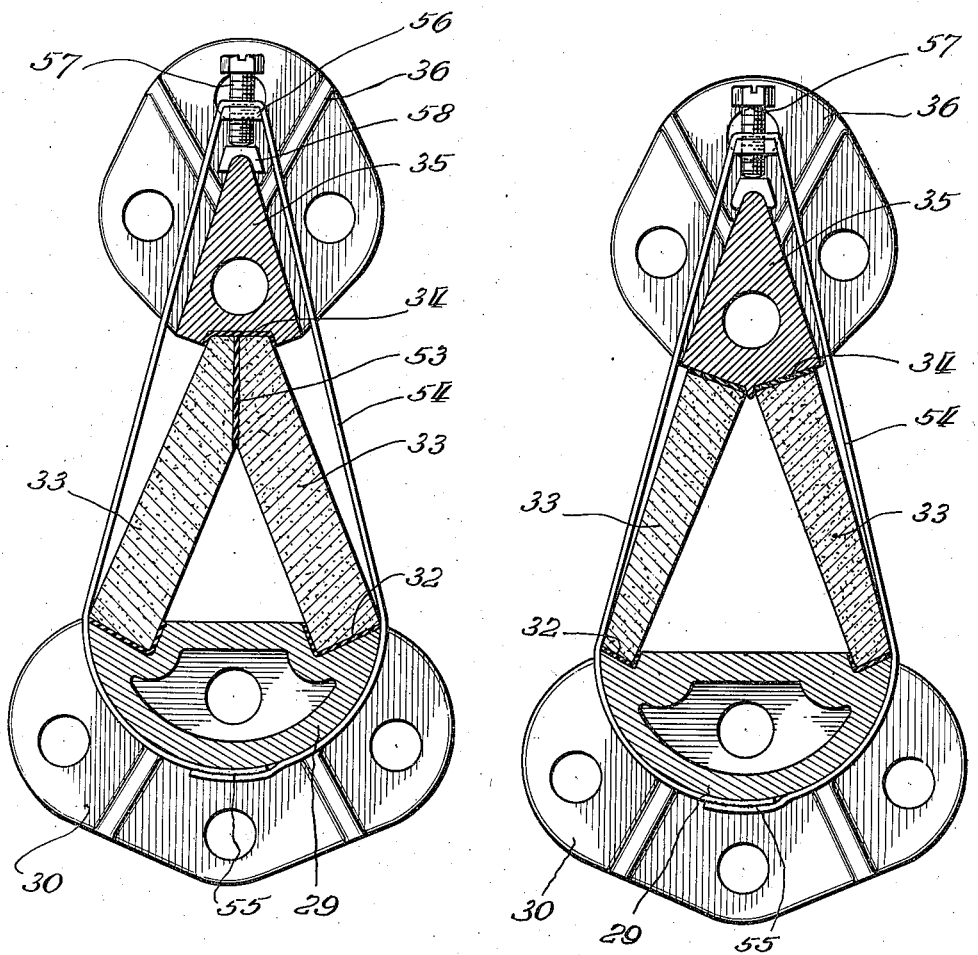

Fig. 9 is a fragmentary sectional detail view, taken on the line 9—9 of Fig. 2, and Figs. 10 and 11 are sectional views similar to Figs. 5 and 7, showing further modified forms of diffusing element.

Referring to the drawings, and particularly to Fig. 1, which shows an aeration tank 10, it is pointed out that this aeration tank may have a cross section as shown in Fig. 1 and be of indeterminate length. Incoming sewage, together with activated sludge, moves progressively and relatively slowly through the aerating tank 10, during which time it is subjected to aeration introduced by a diffuser system. Diffuser systems as heretofore used have been subject to a great many disadvantages. The successful treatment of sewage depends to a considerable extent upon the efficient dissolution of atmospheric oxygen in the mixed liquid in the aerating tank. It is, therefore, very advisable to endeavor to introduce the air in a very finely divided condition, that is, in the form of fine bubbles in order that a larger amount of oxygen may come into contact with the liquid and may dissolve therein. This calls for diffuser plates having relatively fine openings. The bubbles of air introduced into the mixed liquid ascend therein and pass upwardly to the surface. The air is normally supplied at one side and the result of the upward movement of the bubbles is to cause a rotary movement of the mixed liquid to take place. The rotation of the mixed liquid has the effect of keeping solid material in suspension so that it may pass along the length of the tank from the inlet to the outlet.

The rotary movement of the body of liquid in the aerating tank has the objectionable feature that it tends to striate the air supplied by the diffuser so that the air is not well disseminated throughout a large cross section of the liquid in the tank. Another objection heretofore experienced with diffusers is that the column of liquid above the diffuser plates is relatively light owing to the presence in it of a large volume of air bubbles. As a result, a certain amount of solid matter which would normally remain suspended in water, becomes deposited on the diffuser plates, reducing their efficiency.

In the preferred embodiment of the invention illustrated, I mount an air main 11 on one of the side walls of the aeration tank 10. The air main 11 may extend the whole way along this tank or several lengths of such air main may be employed. As best seen in Fig. 1, the air main 11 is preferably located below the normal level of liquid in the tank 10. On the air main 11 I mount a series of T's 12, each provided with a valve 13 controlling admission of air thereinto. The T's 12 are provided at each end with stuffing boxes 14 whereby pipes 15 may be rotatably mounted therein while preserving an air-tight condition. It may be noted that slight leaks of air do not matter since they merely aid the general aeration. As best seen in Fig. 9, one of the pipes 15 extending into the T 12 is closed by a plug 16 and the other pipe 15 is open. These pipes are held in spaced relation within the T 12 by a perforated sleeve 17 therein. It will thus be seen that each valve 13 controls the air supply individually to one of the pipes 15 so that the supply of air can be regulated along the length of the tank or may be cut off from any individual aeration unit depending from one of the pipes 15.

The pipe 15 is provided near its ends with two T's 18 from which depend two pipes 19. The pipes 19 communicate freely with a long chamber 20 of box-like form which is approximately as long as the pipe 15 from which it depends. The chamber 20 is provided with a series of openings 21 along its length, which openings communicate into the interior of a series of diffuser elements 22. As best seen in Fig. 1, the diffuser elements 22 are horizontal and extend outwardly from the chamber 20 in the transverse direction of the aeration tank 10.

On each of the pipes 15 I mount a sprocket wheel 23 over which I pass a chain 24. The chain also passes over a small sprocket wheel 25 rotatably mounted in a bracket 26 at the top of the tank 10. The sprocket 25 may be actuated by a crank handle 27 so as to rotate the pipe 15. When this is done the container 20, together with the diffuser elements 22, are elevated up into the position shown in dotted lines in Fig. 1. It will readily be seen that the air may be shut off by the appropriate valve 13 and any of the aeration elements adjusted, repaired or cleaned. Any suitable means, such as a hook 28, may be provided for holding the elements referred to in their upper position while the work is being done. The return of the aeration elements to their operating position can readily be accomplished, due precaution being taken to prevent violent impact with the wall of the aeration tank.

As indicated above, the air supplied by the aerating elements 22 causes a rotary movement of the liquid in the tank 10, which movement is illustrated by arrows in Fig. 1. This rotation is in the same direction as the uprising air and thus, to some extent, the period of contact between the air bubbles and the liquid is shortened. I prefer to provide on the opposite wall of the tank 10 similar ancillary aerating equipment as shown in Fig. 1. This ancillary equipment is mainly similar to that previously described and corresponding parts are indicated by the same reference numerals with the addition of suffixes. This ancillary equipment differs in three important respects from the main aerating equipment. First, the aerating units 23' are located at a much higher position than the units 23. Second, the whole ancillary equipment is much smaller than the main equipment. Thirdly, the aerating units 23' are inverted with respect to the units 23 since they are intended to inject finely divided air into downwardly flowing liquid, whereas the liquid flows upwardly between the units 22. The units 22 and 22' are stream-lined for these directions of flow since it is desired that the rotating liquid should pass to the fullest extent through the aerating systems. The air admitted by the aerating units 22' is carried downwardly and across the tank by the rotating liquid and consequently executes a long circuitous path therein, which is conducive to a very efficient dissolution of its oxygen in the liquid.

The features of the aerating element 22 constitute an important part of my invention and they will now be described in detail.

Referring particularly to Figs. 4, 5 and 6, the embodiment of diffuser element shown therein comprises a lower support arm 29 which is suitably a hollow casting provided at its inner end with a flange 30 whereby it may be secured to the housing 20 by means of bolts 31. Along opposite edges the arm 29 is provided with inclined seats 32 which serve as abutments for diffuser plates 33. The upper edges of the diffuser plates 33 are chamfered as shown at 34 and these edges abut against the underside of an upper hollow arm 35 which is provided with a flange 36 whereby it is bolted to the housing 20 by bolts 37.

Suitable gaskets 38 and 39 are located between the diffuser plates 33 and the portions of the arms 29 and 35 against which they abut. Any suitable number of plates 33 may be provided along the diffuser element 22. These plates are held in position by an end cap 40 which is bolted to the outer ends of the arms 29 and 35. Suitable gaskets 41 are provided between adjacent diffuser plates and between the cap 40 and the last diffuser plate. A gasket 42 on the face of the chamber 20 serves to prevent entrance of fluid into the interior of the arms 29 and 35. It will be understood that the lengths of the diffuser plates 33 and the thickness of the gaskets 41 enable the cap 40 to apply an effective pressure upon the gaskets. If necessary, additional gasket material may be applied in order to attain this pressure, which should be sufficient to prevent any substantial leakage except through the pores of the diffuser plates.

I prefer to provide means at points intermediate with the length of the diffuser element 22 in order to maintain air-tight relationship between the diffuser plates 33 and the arms 29 and 35. Such means may suitably comprise loops of wire 43, the ends of which are secured in openings 44 of a bar 45. The bar 45 may suitably be located below the arm 29. The bar 45 has threaded openings which receive bolts 46. These bolts 46 are upwardly directed and abut against the underside of the arm 29. It will readily be understood by reference to Fig. 5 that by tightening the bolts 46 a very substantial force may be applied upon the arms 29 and 35, holding them firmly against the plates 33 and compressing the gaskets 38 and 39 into air-tight condition. It will thus be understood that the plates 33, the arms 29 and 35 and the cap 40 constitute, in each diffuser element, an air chamber which receives air from the chamber 20 through the opening 21. The opening 21 is preferably triangular in shape and substantially conforms to the shape of the air chamber within the diffuser element.

The embodiment of diffuser element illustrated in Figs. 7 and 8 differs from the embodiment just described principally in the fact that the diffuser material is made in the form of a duct or pipe 47. The underside of the duct or pipe 47 bows downwardly so as to fit the upper face of the lower arm 29. The upper face of the conduit member 47 is bowed upwardly so as to cooperate with the seat provided by the upper arm 35.

Suitable gaskets 48 and 49 are provided between the duct member 47 and the arms 29 and 35. The pipe sections 47 may be mounted and held in leak-tight relation in the same manner as the embodiment first described. In Fig. 7 I show the arms 29 and 35 braced together by a wire loop 50. This loop passes under a longitudinal bar 51 which carries bolts 52. By tightening these bolts force is applied, tending to draw the arms 29 and 35 together in a manner very similar to the wire 43 in the embodiment first described.

The embodiment of diffuser element illustrated in Fig. 10 includes provision for compensating for the difference of head between the higher and lower portions of the diffuser plates 33. Owing to the lower hydrostatic pressure there is a tendency for the higher portions of the plates to transmit more air. To some extent this air is delivered in the form of larger bubbles which are inefficient for the dissolution of oxygen in the liquid. In this embodiment I chamfer off the upper ends of the diffuser plates 33 and place the chamfer faces together in air-tight relation. This relation may be attained by a gasket or cement 53 interposed between these chamfer faces. In this embodiment straps 54 are provided, the ends of which are welded at 55 to form loops. A nut 56 is welded to the strap in alignment with an opening therein. The strap may be tightened by a bolt 57 threaded into said nut and abutting against an abutment 58 mounted on the arm 35.

In the embodiment of the invention shown in Fig. 11, I correct the tendency of the air to pass more freely through the higher parts of the diffuser plates 33 by tapering these plates downwardly to a slight extent. The greater resistance of the upper part of the plate substantially prevents a larger amount of air passing therethrough owing to the lower hydrostatic pressure than prevails at the lower part of the plate. One advantage of uniform air passage through all parts of the plate is that the bubbles are more uniform in size and on the whole are smaller. The smaller the bubbles are, the more effectively does the liquid dissolve oxygen therefrom.

It will be readily understood that any suitable number of diffuser elements 22 may be mounted on any individual chamber 20. Thus, with reference to Figs. 2 and 3, it is to be noted that I provide seventeen such elements on one chamber 20. These elements are located in parallel relation and are substantially spaced so that liquid may ascend freely between them. It will be noted that these elements are streamlined for liquid flowing in the upward direction. In other words, the exposed diffuser plates and the upper arm 35 are formed to establish an upwardly directed apex. As previously mentioned, the diffuser elements 22' are inverted and are streamlined to present the least resistance to the downward flow of liquid between them.

Referring more particularly to Fig. 1, it will be noted that when the valves 13 are opened air is supplied from the main 11 into the numerous diffuser elements 22. The diffusing material of which the plates 33 or the ducts 47 are made, enables the air to pass into the liquid in the tank 10 in the form of small bubbles, which rise to the surface. In so rising a considerable amount of their oxygen is dissolved in the liquid, the amount depending upon the smallness of the bubbles and the amount of oxygen already held in solution in the liquid. The upward passage of these bubbles causes the liquid to move upwardly and the result is that the fluid rotates in the manner indicated by arrows in Fig. 1. It will be noted that the liquid moves upwardly between the diffuser elements 22 so that the air delivered therefrom becomes intimately mixed with the main body of liquid. In diffusers heretofore employed, the rotating liquid has to move obliquely past the diffuser system, with the result that there was a considerable tendency for the delivered air to be confined into a layer immediately outside of the main rotating mass, leading to low efficiency of oxygen dissolution. By the present invention this objectionable feature is completely overcome.

One of the difficulties experienced with diffusers heretofore known has been the tendency for solid material to deposit upon the diffusing plates. This phenomenon is believed to be due to the fact that the specific gravity of the column above the diffuser is substantially lowered by the presence of a large amount of air. Consequently, certain solid materials which are sufficiently heavy so that they will just remain suspended in moving water or sewage, will sink in the column of air and water. In the present construction such heavy materials merely fall between the adjacent diffuser elements 22 and no trouble is caused thereby.

After the valves 13 are opened and the liquid in the tank 10 is put into rotation, the valves 13' are opened to admit a lesser amount of air. The air thus admitted is carried down and around by the rotating liquid and thus executes a long circuitous path before it escapes to the surface. This prolonged contact with the liquid is highly favorable for the efficient dissolution of the oxygen from the fine bubbles into the liquid.

Although the invention has been described in connection with the specific details of preferred embodiments thereof, it must be understood that such details are not intended to be limitative of the invention except in so far as set forth in the accompanying claims.

Having thus described my invention, what I claim as new and desire to secure by Letters Patent of the United States is:

1. In sewage treatment apparatus, in combination, an aeration tank, and an aerating system comprising a multiplicity of aerating conduits adapted to transmit air located in spaced relation in said tank at a substantial height therein, each of said conduits being of streamlined cross-section and having upwardly sloping diffusing walls to permit circulating liquid to pass between them with slight resistance.

2. In sewage treatment apparatus, in combination, an aeration tank, and an aerating system comprising a multiplicity of parallel spaced aerating conduits spaced from the walls adapted to transmit air, said conduits being of streamlined cross-section to permit the liquid to pass therebetween with slight resistance.

3. In a sewage treatment apparatus, in combination, an aeration tank, and means therein imparting a rotary movement to liquid therein including a conduit having a normally stationary position at a substantial height in said tank having upwardly sloping air transmitting walls, said conduit being of streamlined cross-section in the direction of said movement.

4. In a sewage treatment apparatus, an aeration tank, an aerating system comprising air discharging elements having a normally stationary position at an intermediate height in said tank, and means pivotally supporting said elements above said intermediate heights and sufficiently remote from a wall of the tank to enable the elements to be swung out of the tank.

5. In a sewage treatment apparatus, an aeration tank, an air supply pipe extending longitudinally thereof, and an aerating system pivotally mounted on, and in communication with said pipe, said system comprising a multiplicity of air discharging conduits in spaced relation having a normally stationary position at an intermediate height in said tank, between which the liquid in said tank is adapted to pass freely, said air supply pipe being located above the conduits and sufficiently remote from a wall of the tank to enable said conduits to be swung out of the tank.

6. In a sewage treatment apparatus, an aeration tank, means having a normally stationary position adjacent the bottom of the tank and near one side thereof for injecting air into liquid in the tank, and means having a normally stationary position adjacent the other side and at a substantially higher location for injecting a lesser supply of air into said liquid.

7. In a sewage treatment apparatus, an aeration tank, means having a normally stationary position adjacent one side of the tank for injecting air into liquid in the tank, and means having a normally stationary position adjacent the other side for injecting a lesser supply of air into said liquid, each said air injecting means comprising a multiplicity of horizontal units in spaced relation located sufficiently high to permit said liquid to pass freely therethrough.

8. In a sewage treatment apparatus, an aeration tank, means having a normally stationary position adjacent the bottom of the tank and near one side thereof for injecting air into liquid in the tank, and means having a normally stationary position near the other side and at a substantially higher location for injecting a lesser supply of air into said liquid, each of said air injecting means comprising a multiplicity of horizontal units in spaced relation located sufficiently high to permit said liquid to pass freely therethrough.

9. In a sewage treatment apparatus, an aeration tank, an air injecting device therein having a normally stationary position, means substantially above said air injecting device pivotally supporting said device and mechanical means for swinging said device upwardly about its pivotal support out of the tank, said support being sufficiently remote from a wall of the tank to permit such swinging.

10. In a sewage treatment apparatus, an aeration tank, a header therein, means for supplying air thereto, and isolated diffuser elements having a normally stationary position communicating with said header and extending therefrom freely into the liquid in the tank, at a position substantially above the bottom thereof, each of said elements comprising upwardly converging diffuser plates on opposite sides.

11. In a sewage treatment apparatus, a header, means for supplying air thereto, and isolated tubular diffuser elements mounted on and communicating with said header, each said diffuser comprising top and bottom bars mounted on said header and extending therefrom, and convergent sides of diffusing material therebetween.

12. A hollow diffuser element comprising a top bar, a bottom bar, convergent side plates of diffusing material therebetween and encircling tension means rigidly securing said top and bottom bars together, said bars including mounting means whereby the elements may be mounted in operating relation.

13. A hollow diffuser element comprising a top bar, a bottom bar, and an integral conduit of diffusing material secured therebetween.

14. A hollow diffuser element comprising two upwardly sloping diffusing plates on opposite sides, a bar extending along the upper edges of the plates establishing an air tight relation between the upper portions of the diffusing plates, and means at the lower ends of the plates forming therewith an air chamber, said bar and lower means cooperating with the angularly related edges to prevent removal of the diffusing plates.

15. The method of treating sewage which consists in passing it through an aeration tank, introducing air at one stationary position therein thereby inducing a rotary movement of the sewage in vertical planes, and supplying additional air to the sewage at a stationary position where it is moving downwardly.

CARL H. NORDELL.